Aug. 16, 1932.     A. R. LAWSHE     1,871,622
PROCESS OF MAKING COLORED PHOTOGRAPHIC POSITIVES
Filed March 22, 1930
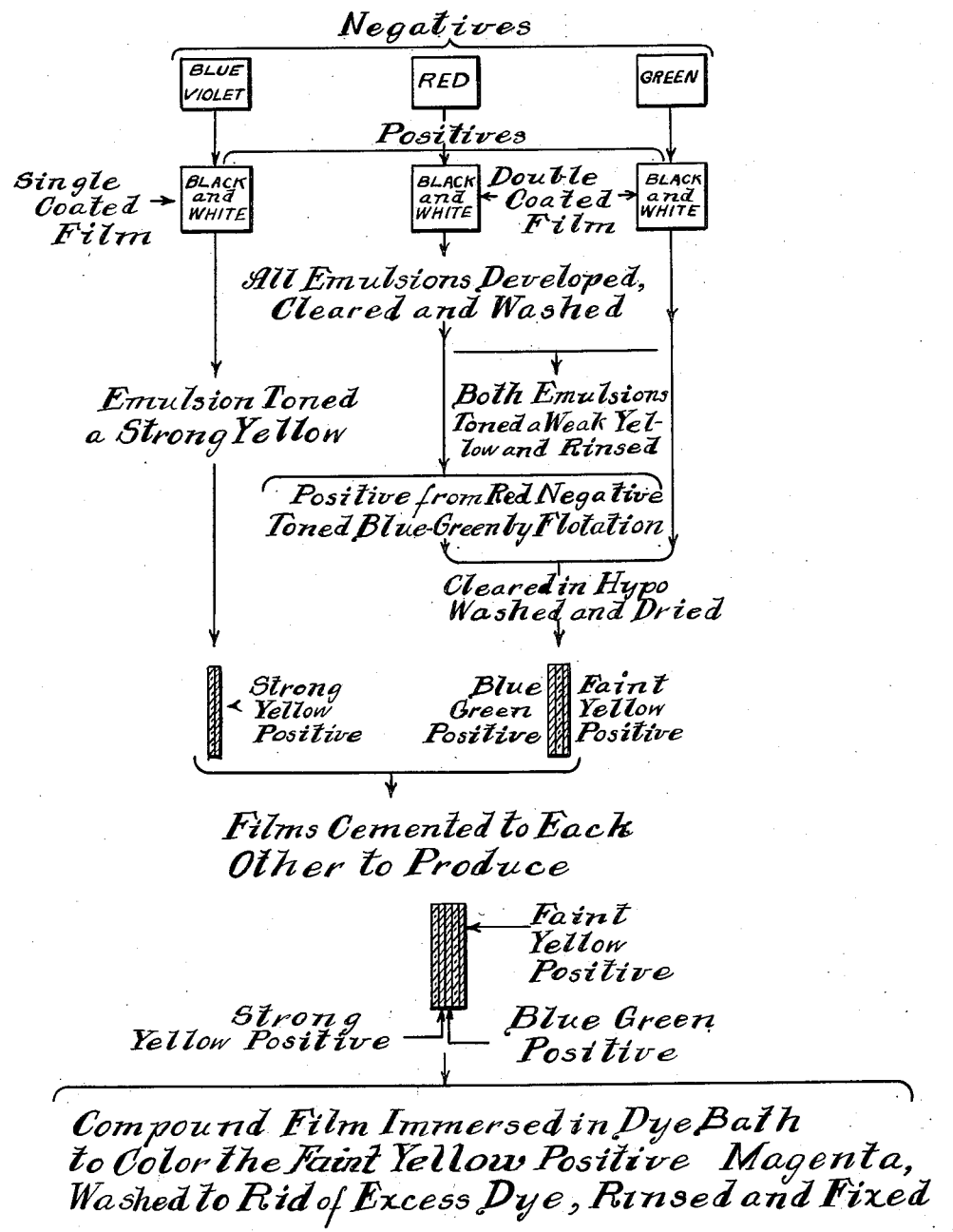

Patented Aug. 16, 1932

1,871,622

UNITED STATES PATENT OFFICE

ALLISON R. LAWSHE, OF TRENTON, NEW JERSEY

PROCESS OF MAKING COLORED PHOTOGRAPHIC POSITIVES

Application filed March 22, 1930. Serial No. 438,237.

This invention relates to natural color photography used for making natural color photographs and motion picture films and particularly to a method whereby black and white positives made from a set of color record negatives may be converted into colored positives and to the assembling of these positives.

In a prior application, Serial No. 398,694 filed October 10, 1929, I disclosed a practical method for obtaining three color representing or color record negatives as the first step in the production of photographs, including motion pictures in natural colors. The present application has to do particularly with the production of the colored pictures from the already made color record or color representing negatives but it is to be understood that the hereinafter described process may be used in connection either with negatives made in accordance with my prior application or with negatives made by any other suitable method. For the purpose of this description, however, I shall assume that the negatives have been made by the method described in said prior application.

A primary object of my invention is to provide a practical and expeditious method for obtaining a positive film such, for instance, as a motion picture positive film of substantially the standard thickness, in which the individual pictures shall appear in complete natural colors.

This method, however, is also capable of use for the production of "still" as well as for motion pictures.

Another object is to provide a process or method such that great fidelity is secured in the reproduction of defination, graduation and all details of the original black and white positives, in which the individual positives are uniformly colored and in which the color of no one component positive is predominant.

The figure of the drawing is a flow sheet of my improved method.

Briefly, the present process involves the use of three differently colored positives, two of them being mounted on one support. Therefore, there are used in my process two "films" using the word "film" in its present day meaning as meaning the photographic emulsion and the support therefor. Two of the positives are colored the desired colors by toning. The films are then cemented together, whereupon the third positive is dyed or the third positive may be dyed and washed out and then the positives be cemented together.

It is well known to those familiar with the principles of subtractive color photography that three negatives are made of the object photographed and that these negatives constitute color records of the so-called primary colors, blue (or, more strictly, blue-violet) green and red. It is also well known that the positives made from these negatives are properly colored, respectively, the complementary colors. Thus, a yellow positive is made from the negative of the blues, a magenta positive from the negative of the greens, and a blue-green positive from the negative of the reds. This procedure is followed in the present process.

A detailed description of the process shown in the drawing herewith follows:

The film used is practically the same as the ordinary motion picture positive film, that is, there is a celluloid or other flexible transparent support upon which the emulsion is borne, but this support is of approximately one-half the standard thickness. A single coated film of one-half the usual thickness is used for one of the positives and a double coated film of one-half the usual thickness for the other two positives. By my double coated film, it is understood that I mean a support coated with photographic emulsion on both sides, thus permitting the one support to carry the two positives. The double coated film should, of course, contain a suitable light restraining agent such as a red or an orange dye to prevent printing through the support. It is to be understood that this dye is washed out during development.

From the negative of the blues or blue-violet, a positive is printed on the single coated film and positives from the other negatives, respectively, are printed in register on opposite sides of the double coated film. These may be developed in the usual way to obtain black and white positives and, after fixing and thoroughly washing to remove the last trace of hypo, all three are bleached by a five minute submersion in the following:— potassium ferricyanide, 6½ ozs., water, 1 gal. The films are then well washed.

Forming the yellow positive:—The single coated film is toned a strong yellow by a ten minute submersion in the following toning bath:—

| | |
|---|---|
| Liquid vanadium chloride | 7½ fl. ozs. |
| Saturated solution of oxalic acid | 6½ fl. ozs. |
| Nitric acid | 3¼ fl. ozs. |
| Water | 1 gal. |

The toned film is washed to rid it of acid and cleared by a brief submersion in:—

| | |
|---|---|
| Sodium thiosulphate | 2 lbs. |
| Water | 1 gal. |

The hypo may then be washed out and the film allowed to dry. At this stage the yellow positive is not transparent. It will be made entirely transparent by the hereinfollowing described cementing operation.

Forming the blue-green positive:—The bleached double coated film is toned a weak yellow on both sides by a two minute submersion in the following:—

| | |
|---|---|
| Liquid vanadium chloride | 3¾ fl. dr. |
| Saturated solution of oxalic acid | 3½ fl. dr. |
| Nitric acid | 1½ fl. dr. |
| Water | 1 gal. | after which it is well rinsed and that side which was printed from the negative of the reds is toned for 30 seconds, by flotation, with the following:—

| | |
|---|---|
| Ferric chloride | 3¾ ozs. |
| Liquid vanadium chloride | 3¾ fl. ozs. |
| Sat. sol. oxalic acid | 13 fl. ozs. |
| Nitric acid | 1⅞ fl. ozs. |
| Water | 1 gal. |

After a brief rinsing in water, both sides of the film are cleared by submersion in a strong solution of hypo. The film may now be washed and allowed to dry. This film must be floated, as stated, on the toning solution in order that none of it may come into contact with the positive on the opposite side.

Cementing the films:—At this stage, the double coated film has a transparent blue-green positive on one side and a faint yellow positive, also transparent, on the reverse side. The blue-green side is now to be cemented, face to face and with the images in register, with the previously prepared single coated and strongly toned yellow film. The film cement is melted before applying. The films must be firmly joined, but it is suggested that only a minimum amount of film cement be used to accomplish this in order that no excess may spread upon the face of the unfinished positive, which is on the outside of the cemented film, the finished blue-green and the strongly toned yellow positives being on the inside. The cement may be applied in a thin layer with a brush. The addition of 2% or 3% of glycerine will make the cement more pliable when dry and prevent any tendency of the films to separate while in use.

Forming the magenta positive:—The unfinished positive is colored by submersing the entire film for six minutes in the following dye bath:—

| | |
|---|---|
| Aniline red, magenta | 20 grs. |
| Glacial acetic acid | 4¾ fl. ozs. |
| Water | 1 gal. | when the film may be rinsed in water to rid it of excess dye and to reduce the positive until it complements the other two positives. During this operation of washing out the surplus dye, which will require perhaps two minutes, the film should be held up to the light at intervals to note progress. If the positive has been properly toned and the dye bath be of the proper strength, one need not expect the positive to be either under or over-dyed. In either case, the difficulty is easily corrected.

If under dyed, return the film to the dye bath; if over dyed, reduce the positive by rinsing in glacial acetic acid 1 fl. oz., water, 1 gal. This will effectually reduce the dye image to the point desired. In fact, I think that it is rather better to purposely slightly over dye and then to reduce in the acid water.

Since the finished blue-green and yellow positives are in the same film and in register with the dyed positive, and since all three are transparent, it is not a difficult matter to determine when the latter is sufficiently washed out and brought into accord with the other two. But inasmuch as the dyed positive has a somewhat deeper and richer tint when dry, it is important that this be reckoned with and allowed for. However, if when dry, it is found that the magenta positive is predominant, the film may be returned to the acid water and more of the dye washed out. Obtaining uniformly dyed positives should offer no difficulties. I have discovered but two reasons for uneven or otherwise unsatisfactory dyeing. These are (a) insufficient toning of the positive to be dyed and (b) too little acetic acid in the dye bath.

If desired, the positive may be dyed before instead of after cementing. To accomplish this, the double coated film is dyed by flotation for not less than three minutes with:—

| | |
|---|---|
| Aniline red, magenta | 1 dr. |
| Glacial acetic acid | 27 fl. ozs. |
| Water | 1 gal. |

The dyed positive is then to have the excess dye washed out until it approximates the density of the blue-green positive on its reverse side, when the film may be dried and examined with the yellow film temporarily placed in register with it, and, if necessary, returned to the acid water to have the dyed positive further reduced.

Or this reduction may be left until after cementation. Incidently, this dye bath may be successfully used for dyeing by submersion instead of or in place of the dye bath hereinbefore described, but the submersion should be for two minutes instead of for six minutes.

Following the washing out of the excess dye the film is to be rinsed in water to get rid of most of the acetic acid when the dye may be fixed by a three minute submersion in tannic acid 4 drs., water 1 gal., and the film rinsed and allowed to dry. If preferred, the dyed side may be blotted before drying and the tannic acid treatment omitted, but because the tannic acid fixes the dye against any possibility of the color running while the film is drying, I regard the fixing of the dye as essential to the best results. It is worth remarking that the tannic acid does not fix the dye against the action of a weak acid, hence the dyed, fixed and dried positive may be further reduced in the acid rinsing water, if required.

Removing the yellow toned positive from the dyed positive:—The dyed positive, in conjunction with the faint yellow vanadium toned positive has a fine magenta color that properly complements the blue-green and strong yellow positives. The yellow image (in the dyed positive) is so weak that the color of the dye image is not thereby seriously altered or degraded. But if preferred and it is a part of this invention—the yellow image may be completely dissolved out, following the rinsing out of the excess dye and prior to the fixing of the dye in tannic acid, by submersing the film for three minutes in anhydrous sodium carbonate 1¼ ozs., water 1 gal.

But if the treatment with sodium carbonate is used, it is necessary to entirely free the emulsion of the alkali by washing and it is likewise imperative to fix the dye in tannic acid. I may also say that the sodium carbonate should not be used until the dyed positive has been properly reduced for this reason:—The yellow vanadium image holds the dye image quite firmly so that reduction of the dye image in acid water is effected evenly over the entire image, whereas after dissolving out the vanadium image, the acid water removes the dye at the expense of the denser parts of the positive. In brief, the step of dissolving out the vanadium toned image is practicable and satisfactory, but it is advisable to completely reduce the dye image before taking it.

It is, of course, possible to modify the tint of the blue-green positive by changing the relative proportions of the ferric and vanadium chlorides in the toning bath. Moreover, the degree of contrast of this positive is considerably under control, the more of nitric acid there is in the bath the greater the contrast of the toned image. The yellow positive also is subject to modification in that less of nitric acid in the bath gives a weaker tint, whereas more of nitric acid gives a stronger, or brownish yellow. It seems pertinent to remark here that the toning baths should be freshly prepared. It has been my experience that a two or three day old toning bath for the yellow and also for the blue-green positive gives a weaker image than does a fresh bath. But age appears to have no adverse effect upon the dye bath.

One of the obvious difficulties in subtractive color photography, where three positives are used, is the obtaining of uniformly colored positives of equal density so that they will properly complement one another.

It should be apparent that the present process offers a satisfactory means for doing this. Treating the films with freshly made toning baths of a definite strength and for a definite time cannot fail to give a yellow positive and a blue-green positive of uniform density and color. And having these positives cemented in register with a to-be-colored third positive, the problem of correctly adjusting the density of the third positive to the other two becomes a comparatively simple matter, for it is to be clearly understood that during the washing out of the dye from the third positive, when frequent inspection is highly desirable, the positives are permanently together in register, are transparent and therefore can readily be inspected. I may add that the cemented films show no tendency to separate during the operations of dyeing, washing, etc., provided that sufficient time has been allowed for the cement to dry out, nor does the dye penetrate between the films. The cement used is not colored by the dye.

It will be apparent to those familiar with the art of subtractive color photography that this process is capable of reproducing all colors, if suitable negatives are used. Thus, a blue area in the object photographed will be opaque in the negative of the blues, whereas the same area will be transparent in the negatives of the greens and reds, respectively. Hence, in the positives made from those two negatives, the corresponding area will be blue-green in one of them and magenta in the other, but the same area will be practically without color in the yellow positive made from the negative of the blues. Therefore, because magenta and blue-green, when superimposed, make blue, the area will appear blue in the finished picture.

In like manner a yellow area will be recorded only on the negatives of the reds and greens, respectively, yellow being made up of red and green, hence the same area in the negative of the blues will be transparent and this being the yellow printing negative, the corresponding area in the finished picture will be yellow. But as this is well understood by those conversant with the subject of three-color photography, it need not be further elucidated.

The process may of course be modified. For example, the yellow positive may be on a transparent temporary support such as that described in a prior application, Serial No. 402,321, filed October 24, 1929. Briefly, this consists of a support bearing a thin layer of transparent rubber on which the gelatine emulsion is spread and which permits the support to be readily stripped off after the picture is finished. The other two positives may be on two permanent supports of one-half standard thickness (instead of on the hereinbefore suggested double coated film) and the finished yellow and blue-green positives cemented together, face to face and in register, and the bleached, but undyed, third positive cemented back to back and in register with the blue-green positive. The third positive may then be dyed and finished as hereinbefore described. When the film is dry the temporary support is pulled off. Also, if desired, the said temporary support may be used for the yellow positive in connection with the hereinbefore suggested double coated film for the other two positives.

Either the process as described, or else one of the suggested modifications of it, is well adapted to the making of so-called "paper" photographs by simply mounting the finished film (which should be less dense than when used as a transparency) on white paper.

I claim:—

1. In the art of color photography, the method of producing a multi-color photograph which consists in preparing from a set of three color record negatives, respectively, two registered positives on opposite sides of a double coated transparent support, and a third positive on another transparent support, coloring said positives, respectively, two different colors, cementing the third positive face to face with and in register with one of the other positives, and finally dyeing the third of said colored positives a different color from the other two.

2. In the art of color photography, the method of producing a multi-color photograph which consists in printing and developing from a set of three color representing negatives three monochrome silver positives, respectively, on two transparent supports, bleaching said three positives and converting them into toned positives colored, respectively, two different colors, cementing said toned positives together and in register, and subsequently dyeing the third of said toned positives a different color from the other two.

3. In the art of color photography, the method of producing a multi-color photograph which consists in printing and developing from a set of three color representing negatives, three monochrome silver positives, respectively, bleaching said three positives and converting two of them into yellow positives by treating them with a solution of vanadium chloride, converting another of said positives into a blue-green positive, cementing one of said yellow positives in register with the blue-green positive, and dyeing the second of said yellow positives a different color from the other two, and finally dissolving out the yellow image from the said dyed positive and fixing the dye in tannic acid.

4. In the art of color photography, the method of producing a multi-color photograph which consists in printing and developing from a set of three color representing negatives, three monochrome silver positives, respectively, one of said positives being on a single coated film, and the other two of said positives being on opposite sides of a double coated film containing an actinic light restraining agent and with the said two positives in register, bleaching said three positives, subsequently toning two of them yellow and the third blue-green, treating the toned positives with sodium thiosulphate, cementing the two films together with the positives in register and one of them on the outside, and subsequently dyeing the outside positive magenta.

5. In the art of color photography, the method of producing a multi-color photograph which consists in printing and developing from a set of three color representing negatives, three monochrome silver positives, respectively, one of said positives being on a single coated film, and the other two of said positives being on opposite sides of a double coated film containing an actinic light restraining agent and with the said two positives in register, bleaching said three positives, subsequently toning two of them yellow and the third blue-green, treating the toned positives with sodium hyposulphite, cementing the two films together with the positives in register and one of them on the outside, subsequently dyeing the outside positive magenta, and finally dissolving out the yellow image from the said magenta dyed positive and fixing the dye in tannic acid.

6. In the art of color photography, the method of producing a multi-color photograph which consists in printing and developing from a set of three color representing negatives three monochrome silver positives, respectively, one of said positives being on a transparent support sensitized on one side and the other two of said positives on opposite sides of a transparent support sensitized on both sides and with the positives in register, said two transparent supports approximately one-half standard thickness, bleaching said three positives and subsequently toning them yellow in a solution of vanadium chloride and further toning one of them blue-green in a solution of ferric-vanadium chloride, treating said toned positives with a solution of sodium hyposulphite, washing and drying the films and cementing them together with the positives in register and one of them on the outside, subsequently dyeing the outside positive magenta and washing out the excess dye.

In testimony whereof I hereunto affix my signature.

ALLISON R. LAWSHE.